Nov. 17, 1942.    R. LANG    2,301,957
FLUID COUPLING AND FRICTION CLUTCH MECHANISM
Filed Sept. 16, 1939
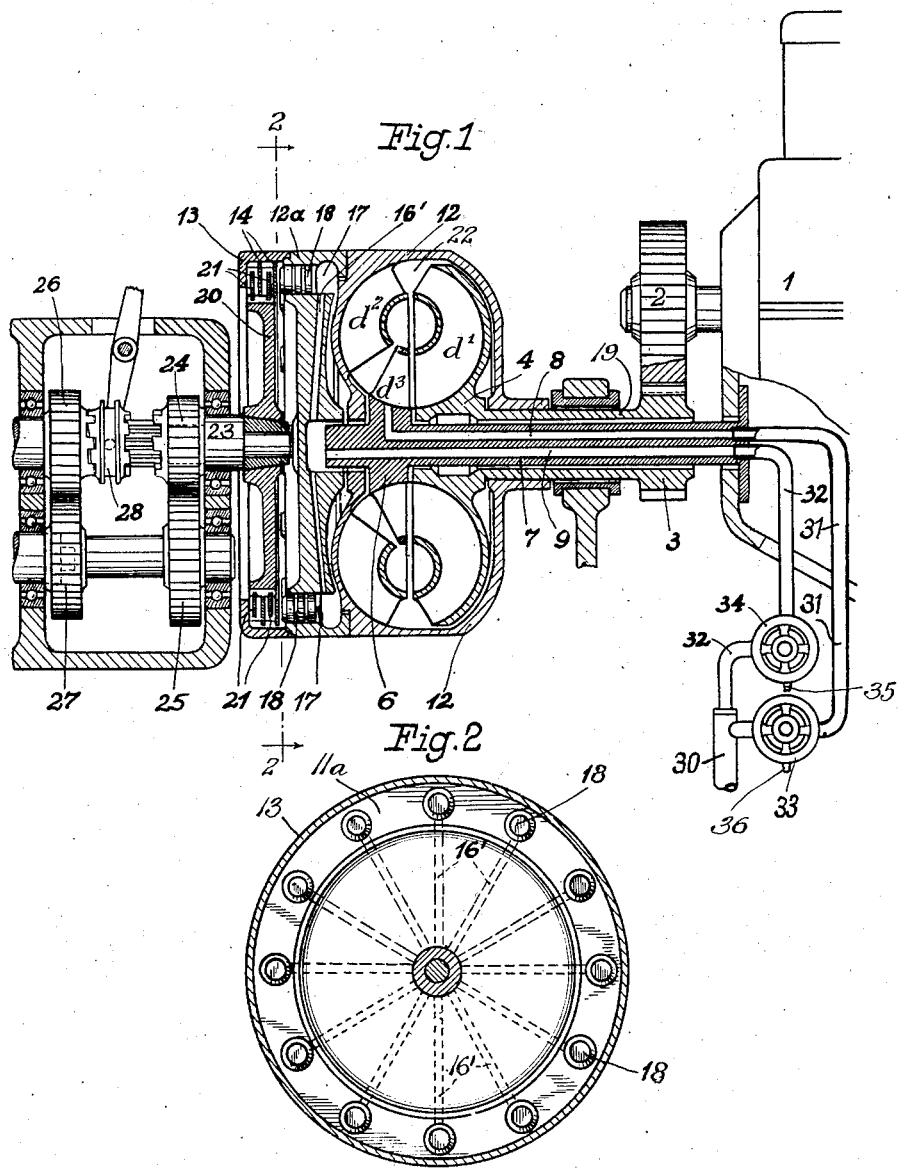
Inventor:
RICHARD LANG
Edmund H. Perry
ATTORNEY Patented Nov. 17, 1942

2,301,957

UNITED STATES PATENT OFFICE 2,301,957

FLUID COUPLING AND FRICTION CLUTCH MECHANISM

Richard Lang, Ravensburg, Wurttemberg, Germany; vested in the Alien Property Custodian Application September 16, 1939, Serial No. 295,315
In Germany September 17, 1938

14 Claims. (Cl. 192—3.2)

This invention relates to combination fluid coupling and friction clutch units such as may be employed, especially in motor vehicles, to transmit power from an engine to a driven shaft, and has particular reference to the arrangement and manner of actuation of the clutch.

In units of the type referred to it has heretofore been proposed to actuate the clutch in response to fluid pressure, but this has entailed considerable constructional difficulties since the fluid pressure had to be transmitted to the clutch parts through rods or similar operating mechanism.

The primary object of the present invention is to provide an improved clutch construction in association with a fluid coupling device, and in particular an improved pressure responsive clutch mechanism, which will avoid the constructional difficulties above mentioned.

In accordance with the invention the fluid pressure actuating means for the clutch is carried by one of the rotary parts of the fluid coupling device. The fluid pressure supply is also housed in such device. An extremely compact unit results, and actuation of the clutch is secured in a simple and effective manner.

The invention further contemplates that the fluid coupling device be designed as a torque converter. The proposed arrangement is such that fluid may be supplied independently to the fluid coupling device and the clutch actuator. Such supply is preferably conducted through a stationary shaft which will support the rotary parts of the torque converter.

In the drawing is shown more or less schematically an exemplary embodiment of the invention.

In such drawing:

Fig. 1 is a longitudinal elevation, partly in section; and,

Fig. 2 is a transverse section taken approximately on line 2—2 of Fig. 1.

An internal combustion motor such as used in motor vehicles is shown at 1. This drives hollow input shaft 19 supported on stationary shaft 7 of a torque converter through gears 2 and 3. Preferably gear 2 is of larger diameter than gear 3 and forms therewith a so-called overdrive providing a gear ratio for fast driving.

The torque converter includes a rotary driving member 4 carrying a series of vanes $d'$, a rotary driven member 12 carrying vanes $d^2$, and a series of fixed vanes $d^3$ secured to the hub 6 of the stationary shaft 7. As shown driven member 12 is formed to provide a casing housing a fluid chamber 22 for engagement with vanes $d'$ and $d^2$.

Fixed to the left end 12a of the rotary driven member of the fluid coupling torque converter is a clutch mounting 13 in which are splined for axial movement disks 14 which form one part of a friction clutch device. Member 20 fixed to driven shaft 23 has splined thereto disks 21 which form the second part of the clutch.

As shown the driven shaft 23 may drive a conventional gear transmission including, for example, pairs of gears 24, 25 and 26, 27 which may be selectively employed through shifting of clutch member 28.

The clutch device, as shown in Figure 1, forms a compact unit with the fluid coupling device, and a fluid pressure actuator for the clutch can be readily associated with the fluid coupling device so as not to necessitate a multiplicity, or awkward arrangement, of operating parts. Arranged in the left end section 12a of the rotary driven member 12 of the fluid coupling device are a series of piston chambers 17 in which work pistons 18. Movement of such pistons to the left in response to fluid pressure supplied to chambers 17 causes the two sets of disks 14 and 21 of the clutch to frictionally engage.

Fluid pressure for actuating the pressure responsive clutch actuating pistons is preferably supplied through a bore 9 in the stationary shaft 7 of the torque converter fluid coupling, and a similar bore 8 in said shaft may supply fluid to chamber 22 to be acted on by vanes $d'$ and $d^2$ of the coupling device.

As shown in Figures 1 and 2 fluid pressure from bore 9 is conducted to piston chamber 17 through individual radially extending bores 16' in section 12a.

A fluid pressure line is indicated at 30, and from this branch off lines 31 and 32, respectively connecting with bores 9 and 8. Valves 33 and 34 are shut-off valves controlling the supply of pressure medium to the clutch actuating means and the torque converter. As shown valves 33 and 34 are of a two-way type so that when turned to cut off the supply of pressure from line 30 the pressure in lines 31 and 32 may be dissipated through the respective vents 36 and 35.

The combination unit according to the invention operates as follows. On opening valve 33 fluid pressure from supply line 30 passes through line 31 and bore 8 into chamber 22 of the torque converter. The fluid is acted upon by blades $d'$ of the driving member of the torque converter under the propelling action imparted to shaft 19 by the motor 1. In response to the action of the fluid vanes $d^2$ begin to rotate member 12 of the torque converter. The driven shaft 23 and parts 24, 25, 26, 27 of the transmission are not yet rotated because of disengagement of clutch parts 14 and 21. Valve 34 is now opened to supply fluid pressure from line 30 through line 32, bores 9, and bores 16' to the individual piston chambers 17. The series of pistons 18 are thereupon moved to the left to bring disks 14 and 21 into frictional engagement. Thereupon clutch member 20 and shaft 23 begin to rotate and driving power is supplied to the gear transmission.

When a gear shift is to be made in the transmission it is not necessary to drain the fluid from the torque converter chamber 22, and it is therefore not necessary for ordinary operation to use a two-way valve in the position of valve 33. To effect shift in the transmission the friction clutch is disengaged by releasing the pressure acting on pistons 18. This can be done by venting pressure through the vent 35 of two-way valve 34 or through some equivalent arrangement. After the shift is completed valve 34 is again operated to supply pressure to the clutch actuating pistons.

As previously noted the construction is extremely compact so as to require a minimum of space and very reliable operation. By continuously maintaining fluid circulation in the torque converter interruptions therein are to a great degree avoided. It is ordinarily not necessary to completely release all of the pressure from the fluid system of the clutch actuator, it being only necessary that the pressure on pistons 18 be relieved sufficiently to permit clutch disks 14 and 21 to rotate independently. Accordingly, engagement and disengagement of the clutch can be effected very rapidly.

The invention is not to be taken as limited to the details of construction shown in the drawing, but rather the scope thereof is to be determined by the appended claims.

I claim:

1. In combination, a stationary supporting shaft, rotary fluid driving and driven members on said shaft, coacting clutch members movable to and from frictional engagement, one of said clutch members being secured to the driven member of the fluid coupling device for rotation therewith, fluid pressure responsive means for actuating the clutch, and fluid supply means in said stationary supporting shaft for supplying fluid both to the driving and driven members of the fluid coupling device and to the clutch actuating means.

2. In combination, a fluid coupling device comprising rotary fluid driving and driven members, a driven shaft, a friction clutch forming a driving connection between the fluid coupling device and the driven shaft, said clutch comprising coacting clutch members driven through the driven member of the fluid coupling device and being movable into and out of frictional engagement with each other, and fluid pressure actuating means for the clutch device carried by the driven member of the fluid coupling device.

3. In combination, a fluid coupling device comprising rotary fluid driving and driven members, a driven shaft, a friction clutch forming a driving connection between the fluid coupling device and the driven shaft, said clutch comprising coacting clutch members, one of said clutch members being carried by the driven member of the fluid coupling device and being movable to and from engagement with the other clutch member, and fluid pressure means carried by the driven member of the fluid coupling device for actuating the clutch device.

4. A power transmission device for connecting driving and driven shafts comprising fluid coupling means having rotary fluid driving and driven coupling members, a friction clutch having coacting clutch members movable into and out of engagement with each other, one of said clutch members and one of said coupling members having a driving connection, fluid pressure operated actuating means for the friction clutch, and fluid supply means for the clutch actuating means carried by the fluid coupling means, the other of the coupling members being connectable with one of said shafts and the other of the clutch members being connectable with the other of said shafts.

5. A power transmission device for connecting driving and driven shafts comprising fluid coupling means having rotary fluid driving and driven coupling members, a friction clutch having coacting clutch members movable into and out of engagement with each other, one of said clutch members and one of said coupling members having a driving connection, fluid pressure chamber means carried by said coupling member, and fluid pressure actuating means for the clutch device responsive to pressure in said chamber means, the other of the coupling members being connectable with one of said shafts and the other of the clutch members being connectable with the other of said shafts.

6. A power transmission device for connecting driving and driven shafts comprising fluid coupling means having a fluid housing, a rotary fluid driving member for circulating fluid in said housing and a rotary fluid driven member in said housing, a friction clutch having coacting clutch members being movable into and out of frictional engagement with each other, one of said clutch members and one of said coupling members having a driving connection, fluid pressure chamber means in said fluid coupling device, and actuating means for the clutch responsive to pressure in said chamber means, the other of the coupling members being connectable with one of the shafts and the other of the clutch members being connectable with the other of said shafts.

7. The combination as in claim 6 wherein separate fluid pressure supply means supply fluid to the fluid housing of the fluid coupling device and the chamber means of the clutch actuating means.

8. A power transmission device for connecting driving and driven shafts comprising fluid coupling means having rotary fluid driving and driven coupling members, a friction clutch having coacting clutch members movable into and out of engagement with each other, a clutch mounting for one of said clutch members rigid with one of said coupling members, fluid pressure actuated means in said coupling member for actuating said clutch member, the other of the coupling members being connectable with one of said shafts and the other of the clutch members being connectable with the other of said shafts.

9. A power transmission device for connecting driving and driven shafts comprising a fluid torque converter having vaned rotary fluid driving and driven coupling members, and a fluid pressure chamber in the driven member of the torque converter, a friction clutch having coacting clutch members movable to and from engagement, one of said clutch members being carried by the driven member of the torque converter and actuating means for the clutch responsive to fluid pressure in the chamber of the driven member of the fluid coupling device, said driving coupling member being connectable with the driving shaft and the other of the clutch members being actuatable with the driven shaft.

10. A power transmission device for connecting driving and driven shafts comprising fluid coupling means having rotary fluid driving and driven coupling members, a supporting shaft for said members, a friction clutch having coacting clutch members movable into and out of engagement with each other, said driving clutch member being carried by said driven coupling member, fluid pressure actuated means carried by the driven member of the fluid coupling means for actuating the friction clutch and fluid pressure supply means in the supporting shaft of the fluid coupling device supplying fluid pressure for operating the clutch actuating means, said driving coupling member being connectable with the driving shaft, and the driven clutch member being connectable with the driven shaft.

11. A combination as in claim 10 wherein separate fluid supply means is located in said supporting shaft and supplies fluid to the driving and driven members of the coupling device.

12. A power transmission device comprising a fluid torque converter having a fixed member and rotary driving and driven coupling members, a friction clutch having coacting clutch members movable into and out of engagement with each other, one of said clutch members being carried by one of said coupling members, fluid pressure operated actuating means for the clutch, and fluid pressure supply means for the clutch actuating means carried by the fixed member.

13. A power transmission device comprising a hydraulic torque converter having a series of stationary guide vanes carried by a fixed shaft, a friction clutch having driving and driven members movable into and out of engagement with each other, one of said members being mounted in driving relationship with the torque converter, fluid pressure operated actuating means for the friction clutch and fluid pressure supplying conduit means in the fixed shaft for supplying fluid to the torque converter and to the fluid clutch actuating means.

14. A torque transmission device comprising fluid coupling means, axially movable friction clutch means, and fluid pressure operated actuating means for the friction clutch means carried by the fluid coupling means for controlling torque transmission by the friction clutch means, said fluid pressure operated actuating means comprising axially movable expansive chamber motor means, and fixed conduit means communicating with the expansive chamber motor means for supplying fluid pressure independently of the speed of rotation of the device to operate the friction clutch.

RICHARD LANG.